(12) United States Patent
Quine et al.

(10) Patent No.: US 7,894,655 B2
(45) Date of Patent: **\*Feb. 22, 2011**

(54) CONFIRMING CANCELLATION OF TRUNCATED CHECKS

(75) Inventors: Douglas B. Quine, Bethel, CT (US); Frederick W. Ryan, Jr., Oxford, CT (US)

(73) Assignee: Pitney Bowes Inc., Stamford, CT (US)

( \* ) Notice: Subject to any disclaimer, the term of this patent is extended or adjusted under 35 U.S.C. 154(b) by 0 days.

This patent is subject to a terminal disclaimer.

(21) Appl. No.: 12/630,385

(22) Filed: Dec. 3, 2009

(65) Prior Publication Data
US 2010/0080441 A1 Apr. 1, 2010

Related U.S. Application Data

(63) Continuation of application No. 11/224,274, filed on Sep. 12, 2005, now Pat. No. 7,653,233.

(51) Int. Cl.
*G06K 9/00* (2006.01)
(52) U.S. Cl. .................................. 382/137

(58) Field of Classification Search ......... 382/135–140; 194/4–7; 209/534–536; 235/379–380; 250/200–205; 356/71–73; 902/7–9; 705/45–48
See application file for complete search history.

(56) References Cited

U.S. PATENT DOCUMENTS

| 2,711,689 A | 6/1955 | Kaplan |
| 4,877,948 A | 10/1989 | Krueger |
| 5,737,440 A | 4/1998 | Kunkler |
| 5,864,629 A | 1/1999 | Wustmann |
| 2003/0009420 A1 | 1/2003 | Jones |
| 2003/0068077 A1 | 4/2003 | Koakutsu |

*Primary Examiner*—Samir A Ahmed
*Assistant Examiner*—Atiba O Fitzpatrick
(74) *Attorney, Agent, or Firm*—Brian A. Collins; Steven J. Shapiro; Charles R. Malandra

(57) ABSTRACT

A method of operating a check processing system includes scanning a check on a first occasion to generate a first image of the check. The first image is transmitted to a financial institution. The check is scanned on a second occasion later than the first occasion to generate a second image of the check. The second image of the check is transmitted to the financial institution. The second image of the check is examined to determine whether the check was cancelled prior to the second occasion.

6 Claims, 7 Drawing Sheets

CONFIRMING CANCELLATION OF TRUNCATED CHECKS

This is a continuation of application Ser. No. 11/224,274 filed Sep. 12, 2005, which is owned by Pitney Bowes Inc. the assignee of this application. This invention relates generally to the field of information processing systems used in the financial services industry, and more particularly to processing of paper checks.

BACKGROUND

The federal Check Truncation Act enacted in 2003 (commonly referred to as "Check21") inaugurated sweeping changes in the handling of paper checks by the banking industry and its customer. According to traditional practices, a paper check passes from the drawer to the payee to the payee's bank, then through clearing channels to the drawee bank and thence after cancellation and payment back to the drawer. Check21, however, facilitates "truncation" of the paper check. That is, a party at or downstream from the payee may withhold the paper check from further handling, and may instead pass an electronic image or a so-called "substitute check" through the banking channels in lieu of the paper check. In short, Check21 allows banks and/or their customers to replace at least some handling of paper checks with electronic transfers of image data and/or other information. Consequently, it is now permitted for a payee to scan a paper check and to submit an image of the check to the payee's bank for further processing and payment and crediting to the payee's account.

Automatic scanning devices have been developed to process batches of checks at the payee's location or at a bank teller's station. The scanning devices scan a check or a batch of checks to generate images thereof and may also include one or more printers to print endorsements, cancellation marks or cancellation strings of characters or the like on the checks. The image data may be communicated from the scanning device to a personal computer or the like, which may forward the image data for further processing, and which may also control the printing performed by the scanning device.

Since checks may no longer leave the payee's hands for deposit, presentment, payment, etc., the possibility arises that the payee may attempt to wrongfully present the check for payment or credit more than once. For example, the payee may use a scanning device to present an image of a check for payment, but may tamper with the scanning device or take other steps to effectively prevent the scanning device from printing on the check or otherwise marking the check. The unmarked check may then again be presented for payment, e.g., by cashing the check at the drawee bank. It would be desirable to take steps to detect, prevent and/or deter wrongdoing of this type.

SUMMARY

Accordingly, an improved check processing system and method are provided. The improved method includes scanning a check on a first occasion to generate a first image of the check, transmitting the first image to a financial institution, scanning the check on a second occasion (later than the first occasion) to generate a second image of the check, transmitting the second image of the check to the financial institution, and examining the second image of the check to determine whether the check was cancelled prior to the second occasion.

The first and second images may both be generated by the same scanning device. The second occasion may immediately follow the first occasion (e.g., within a few seconds or minutes). The examining may be performed automatically by a computer at the financial institution. The examining may include comparing the second image to the first image.

In another aspect, an improved method of operating a check scanning device includes first feeding a check in a forward direction along a feed path in the check scanning device. During the first feeding, the check is scanned to generate a first image of the check, and the check is canceled. The method further includes second feeding the check in a reverse direction along the feed path and scanning the check to generate a second image of the check. The second image captures at least a cancellation mark on the check.

The scanning to generate the second image may be performed during the second (reverse direction) feeding. Alternatively, the method may include third feeding the check (after the reverse direction feeding) in the forward direction, and scanning to generate the second image during the third feeding. The method may also include disabling a printing component of the check scanning device during the third feeding.

In another aspect, an improved system includes a check scanning device for scanning and canceling checks and a computer in communication with the check scanning device for receiving images of the scanned checks. Some of the checks are selected for scanning a second time. The scanning device re-scans the selected checks and the computer examines the check images generated by the re-scanning to determine whether the selected checks were canceled by the check scanning device.

The selection of checks for re-scanning may be performed either by the computer or by the check scanning device. For example, the check scanning device may select for re-scanning the final check in each batch of checks processed by the check scanning device. The computer may examine the images generated by re-scanning by comparing the images with at least one image generated by an initial scan of the selected checks.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

The present invention includes a check processing system and a method or methods that may be employed in the check processing system. The system and/or methods may operate to confirm that cancellations are being applied to paper checks submitted in the form of image data for deposit in a financial institution. As a spot check against either intentional tampering with a check scanner or innocent malfunctioning of the scanner, the financial institution computer which receives the initial presentation-by-image of the checks may select certain ones of the checks for re-submission to the financial institution. The computer may send instructions to the submitting bank customer to re-submit the selected check or checks by scanning again with the check scanner. The computer at the financial institution may examine the re-submitted image(s) to determine whether those images reflect cancellation marks that should have been applied to the checks by the scanner during the initial submission of the checks. If not, or if the customer fails to re-submit the requested checks, further steps may be taken to investigate for possible fraud or malfunctioning of the scanner.

The foregoing arrangement accommodates the requirement of Check21 that checks be scanned for submission prior to cancellation. Because of this requirement, it is not feasible to print the check cancellation on the check before scanning the check.

In some embodiments, the scanner may select one or more checks from a batch of checks that the scanner is processing. For example, the scanner may operate to automatically re-scan (and thus re-submit to the bank computer) the last check of every batch. Again the bank computer may examine the re-submitted image to determine that cancellation marks are reflected in the re-submitted image. If the cancellation marks are not present, the bank computer may trigger an investigation or other procedure to address an apparent malfunction or other problem with the scanner.

Figure 1:
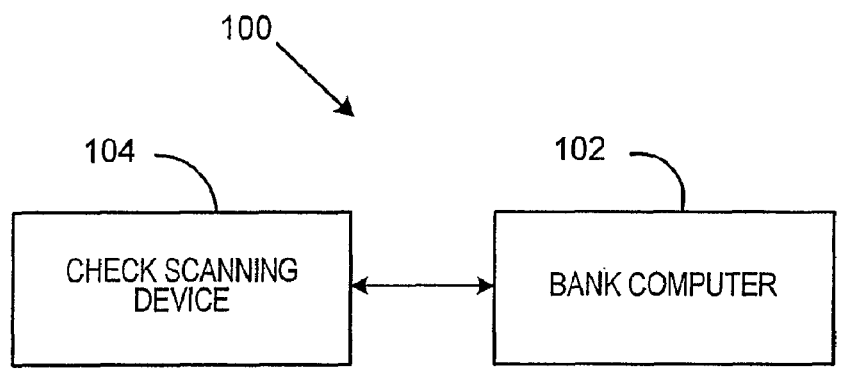
FIG. 1 is block diagram of a check processing system provided in accordance with the present invention.

Referring now to the drawings, and particularly to FIG. 1, the reference numeral 100 indicates generally a check processing system provided in accordance with the present invention. The printing system 100 includes a financial institution computer 102 and a check scanning device 104. The check scanning device 104 is in communication, at least at times, with the financial institution computer 102. As used herein and in the appended claims, "communication" refers to constant, continual, temporary and/or intermittent data communication between two devices and/or computers. As used herein and in the appended claims, "financial institution" includes a bank, a check processing company and/or any party that operates a computer to serve a bank or check processing company.

Figure 2:
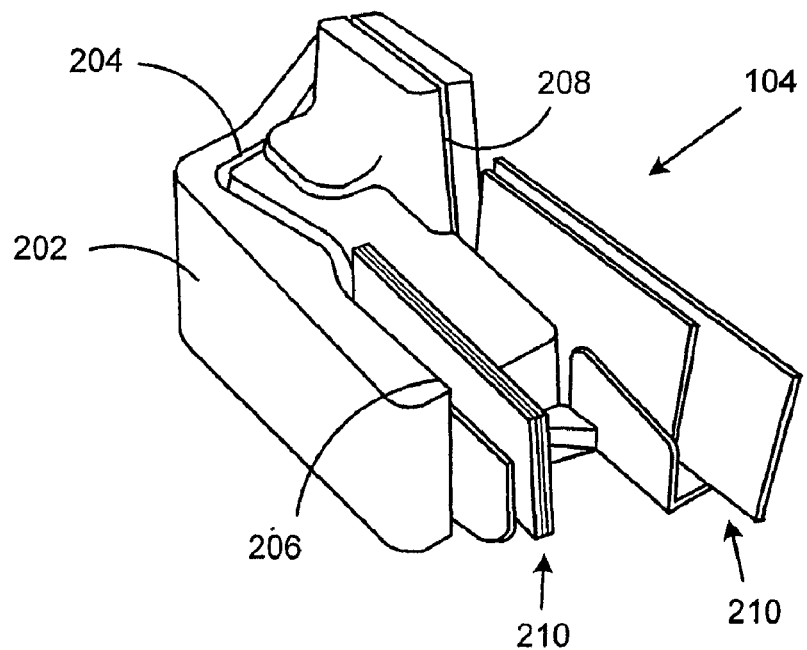
FIG. 2 is a perspective view of an example of a check scanning device that is part of the system of FIG. 1.

FIG. 2 is a perspective view of an example of the check scanning device 104. As seen from FIG. 2, the check scanning device 104 includes a housing 202 in which there is formed a generally U-shaped feed path 204 defined between an infeed slot 206 and an outfeed slot 208. Also visible in FIG. 2 is a batch of checks 210 divided between checks awaiting processing in the infeed slot 206 and checks in the outfeed slot for which processing is complete. The check scanning device 104 is operative to feed checks along the feed path 204 from the infeed slot 206 to the outfeed slot 208. In some embodiments, the check scanning device 104 may operate entirely in accordance with conventional principles. For example, while the checks are being fed along the feed path, the scanning device may scan the front (and possibly also the back) of the checks to generate images of the checks. After scanning, the scanning device prints an endorsement, or a cancellation mark or string or the like on the check as the check is fed through a latter portion of the feed path. The TellerScan 220 scanner available from Digital Check Corporation, Northfield, Ill. is one example of a device that may constitute the check scanning device illustrated herein.

Figure 3:
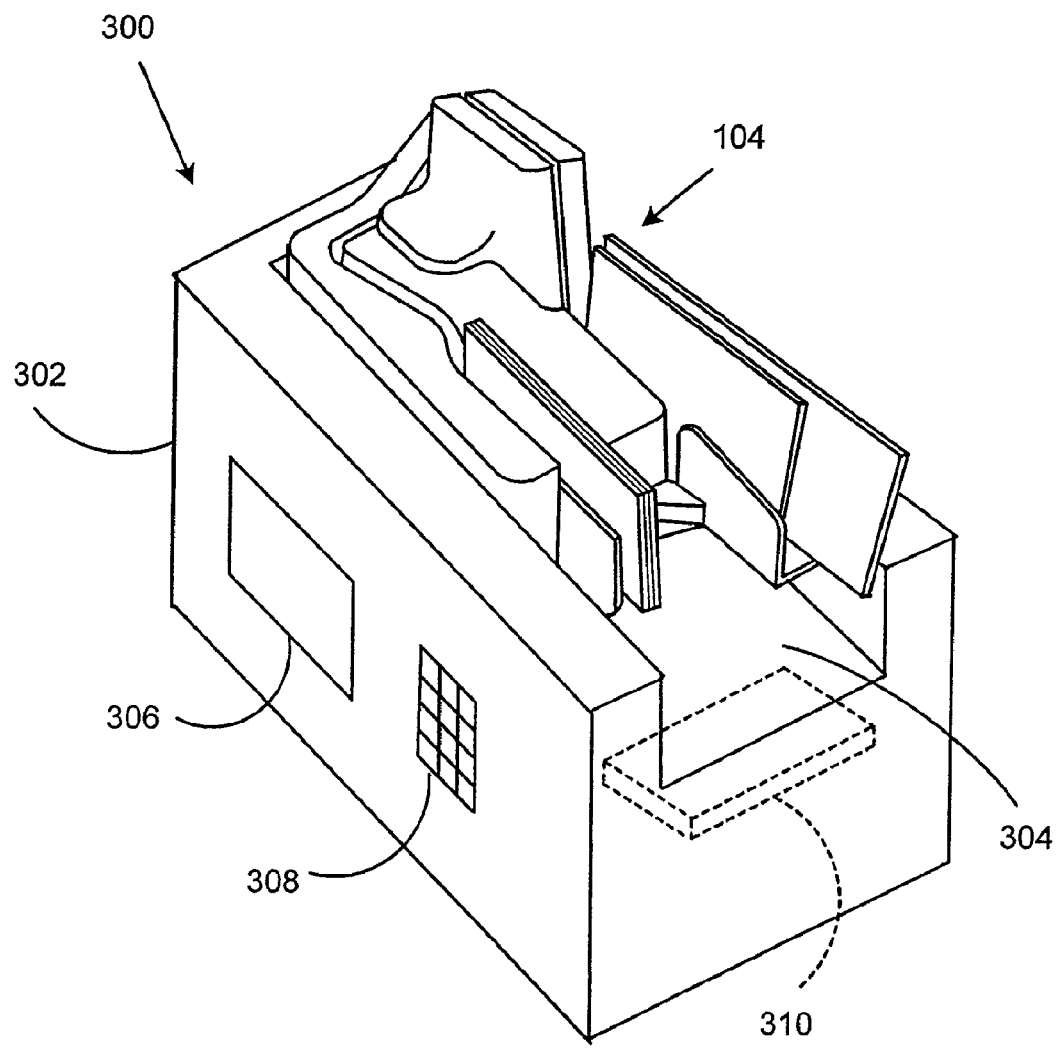
FIG. 3 is a perspective view of another example of the check scanning device.

FIG. 3 is a perspective view of an augmented check scanning device 300 that may be used in the system 100 in the place of the check scanning device 104 shown in FIG. 2. The check scanning device 300 may provide an enhanced user interface and may entirely incorporate a scanner 104 of the type referred to above. For example, the top of the casing 302 of the check scanning device 300 may include a shelf 304 to accommodate the scanner 104. Mounted at the front of the check scanning device 300 are a display screen 306 and a keypad 308. A circuit board 310 (shown in phantom) or the like may be housed within the casing 302 to provide control functions for the scanning device 300 and its constituent scanner 104. A USB signal path (not shown) may provide a data communication connection between the circuit board 310 and electronic components (not separately shown) of the scanner 104. The display screen 306 and keypad 308 (and other components which may be present but are not shown) may allow for improved user interaction with and control of the scanner 104. Further, because of the circuit board 310, the check scanning device 300 may have additional and/or improved functions as compared to the scanner 104 standing alone.

Figure 4:
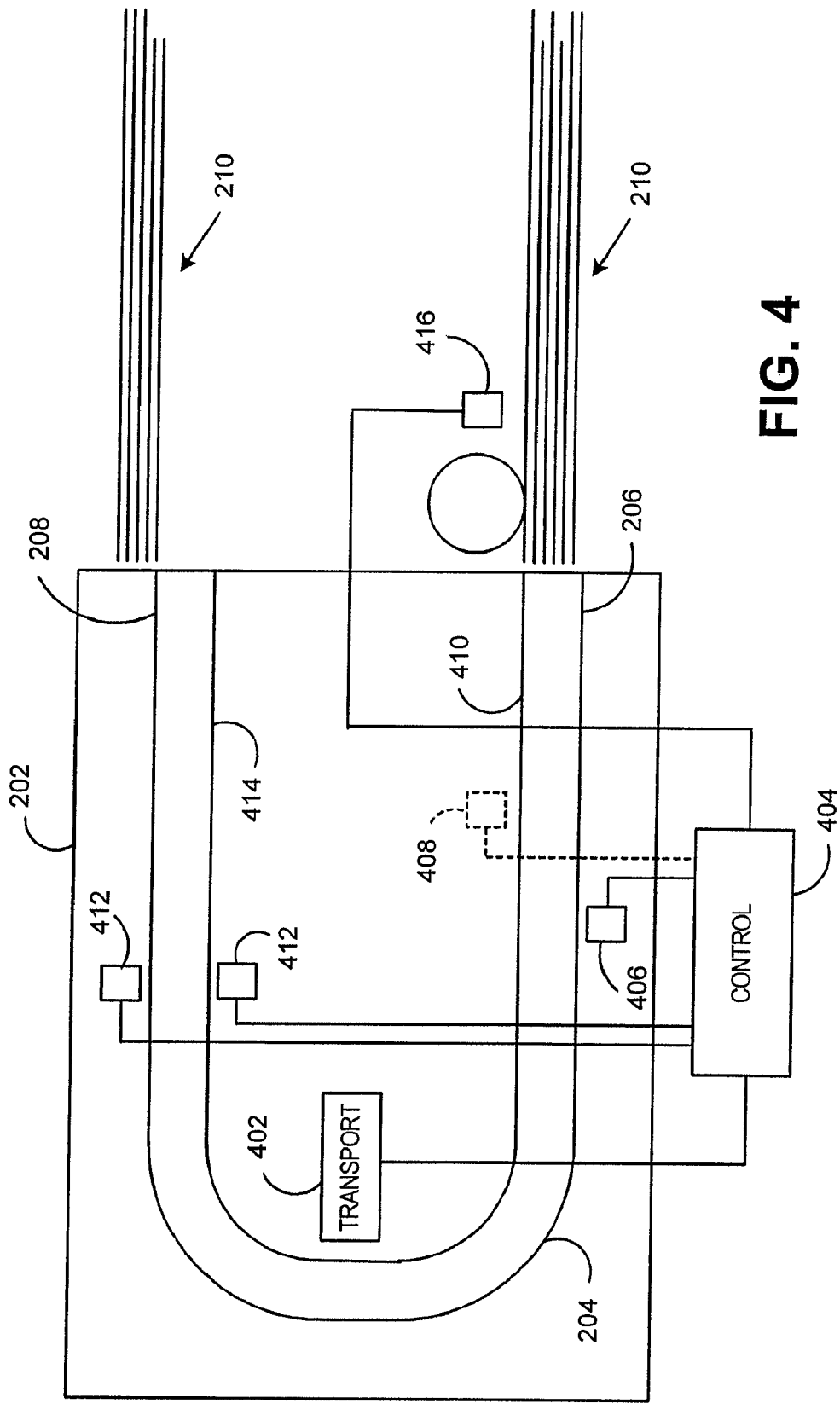
FIG. 4 is a schematic plan view of the check scanning device of FIG. 2 or FIG. 3.

FIG. 4 is a schematic plan view of the check scanning device 104, including its housing 202, infeed slot 206, feed path 204 and outfeed slot 208. Electro-mechanical components which transport the checks along the feed path 204 are schematically represented by block 402. Block 404 may also include a communication device for communicating with back computer 102. A control circuit for the check scanning device 104 is schematically represented by block 404. The control circuit 404 may be microprocessor-based, and may be constituted at least in part by the circuit board 310 shown in FIG. 3.

The check scanning device 104 may include one or two line-scan cameras 406, 408 to generate images of the fronts and possibly also the backs of the checks 210. The line-scan cameras 406, 408 may be located adjacent an initial segment 410 of the feed path 204 and may be positioned on opposite sides of the feed path 204 from each other.

The transport components 402 are operable to transport the checks in a forward direction along the feed path 204, the forward direction being the direction along the feed path from the infeed slot 206 to the outfeed slot 208. As will be seen, in some embodiments, the transport components 402 may also be selectively operable under the control of the control circuit 404 to stop a check at or just before the outfeed slot 208 and then to transport the check in a reverse direction along the feed path 204 at least as far back as the line-scan camera(s). (The reverse direction is the direction along the feed path from the outfeed slot to the infeed slot.) Since the check may be stopped (when re-scanning is required) prior to out feed, it is easy to reverse-feed the check and there is no need to provide a device to retrieve the check from the out feed slot. If the motors (not separately shown) included in the transport components 402 are DC (direct current) drive motors, the motors may be easily operated in reverse by reversing the voltage applied to the motors. Such an arrangement may be provided at low cost. Also, if the checks are reversed before out feed, it may be quite difficult for a would-be wrongdoer to substitute a cancelled check in an attempt to deceive the cancellation-confirmation operation.

In some embodiments, the transport components 402 may include a drive wheel or roller (not separately shown), which drives the check past the line-scan camera(s). The drive wheel may also be utilized as a tachometer which is linked to the line-scan camera(s) to clock scanning operations of the camera(s). In this way, the camera(s) can be clocked properly as the check moves by the camera(s). Any changes in velocity of the check will be compensated for by adjustments in the camera scan rate so that the resulting image is not distorted (e.g., by stretching if the check were slowed down or by compression if the check were speeded up). Thus, speed variations due to drag, voltage fluctuations or component variability can be compensated for.

The check scanning device 104 may also include one or two print heads 412 (two shown) for printing cancellation marks and/or character strings, endorsements and the like on the front and/or back of the checks. As shown, the print heads 412 may be located at a downstream segment 414 of the feed path 204 and positioned on opposite sides of the feed path from each other. The print heads may be ink-jet type print heads or of other types. In addition or as an alternative to one or both print heads, the check scanning device may have another cancellation device or devices (not shown) to perform an operation such as embossing, perforating or scraping the checks to signify cancellation thereof.

The check scanning device 104 may further include a sensor 416 associated with the infeed slot 206 to indicate whether or not any checks are present in the infeed slot 206. Other sensors, which are not shown, may also be present at various locations, including one or more locations along the feed path 204.

In addition, the check scanning device 104 may include a component (not shown in the drawing) which is operative to read the MICR (magnetic ink character recognition) fields on the checks.

Figure 5:
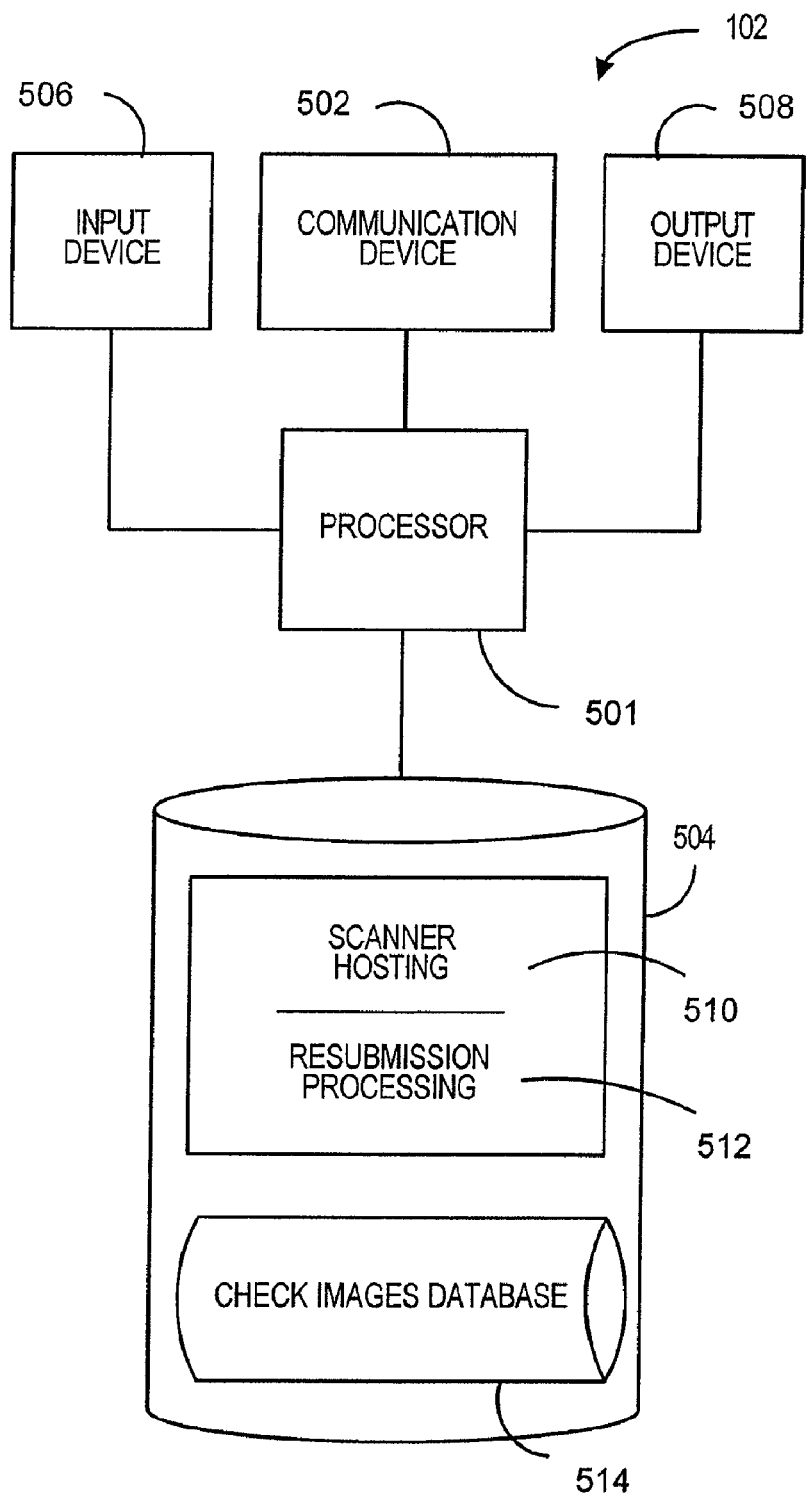
FIG. 5 is a block diagram of a financial institution computer that is part of the system of FIG. 1.

FIG. 5 is a block diagram of the financial institution computer 102. The computer 102 may be operative to perform functions to be described below in connection with check processing and/or detection, deterrence or prevention of either intentional tampering with the check scanning device 104 or innocent malfunctioning of the check scanning device.

As depicted, computer 102 includes a computer processor 501 operatively coupled to a communication device 502, a storage device 504, an input device 506 and an output device 508.

Processor 501 may be constituted by one or more conventional processors, and operates to execute processor-executable process steps so as to provide desired functionality, such as functionality described herein.

Communication device 502 may be used to facilitate communications with, for example, check scanning device 104. Communication device 502 is therefore preferably configured with hardware suitable to physically interface with desired external devices and/or network connections. (It should be understood that communication device 502 may comprise one or more communication ports to allow the computer 102 to be in communication with one or more other devices, such as a considerable number of check scanning devices, at any one time. Correspondingly, the check processing system may include other check scanning devices in addition to the one check scanning device shown therein.)

Input device 506 may include, for example, a keyboard, a keypad, and/or a mouse or other pointing device. Output device 508 may include, for example, a display (e.g., a display screen), a speaker, and/or a printer.

Storage device 504 may comprise any appropriate information storage device including combinations of magnetic storage devices (e.g., magnetic, tape and hard disk drives), optical storage devices such as CDs and/or DVDs, and/or semiconductor memory devices such as RAM and ROM devices.

Storage device 504 stores a program 510 for controlling processor 501. The program 510 includes processor-executable process steps for controlling the computer 102 so that the computer 102 operates to serve as a host to receive check image data from a number of check scanning devices operated by bank customers. The program 510 includes, in accordance with aspects of the invention, resubmission processing routines 512 to selectively request resubmission of check images to the computer 102 and/or to examine the images as described below.

Storage device 504 may also store other software (not indicated in the drawing) such as an operating system, device drivers, database management software and other application programs to allow the computer 102 to perform other functions related or unrelated to receiving and processing images of checks.

Any or all process steps of computer 102 may be read from a computer-readable medium, such as a floppy disk, a CD-ROM, a DVD-ROM, a Zip™ disk, a magnetic tape, or a signal encoding the process steps, and then stored in a storage device 504 in a compressed, uncompiled and/or encrypted format. Processor-executable process steps being executed by processor 501 may typically be stored temporarily in RAM (not separately shown) and executed therefrom by processor 501. In alternative embodiments, hard-wired circuitry may be used in place of, or in combination with, processor-executable process steps for implementation of processes according to embodiments of the present invention. Thus, embodiments of the present invention are not limited to any specific combination of hardware and software.

Storage device 504 also stores one or more databases, including, for example, check images database 514. The check images database 514 stores images of checks, which images have been uploaded to the computer 104 from check scanning devices.

Figure 6A:
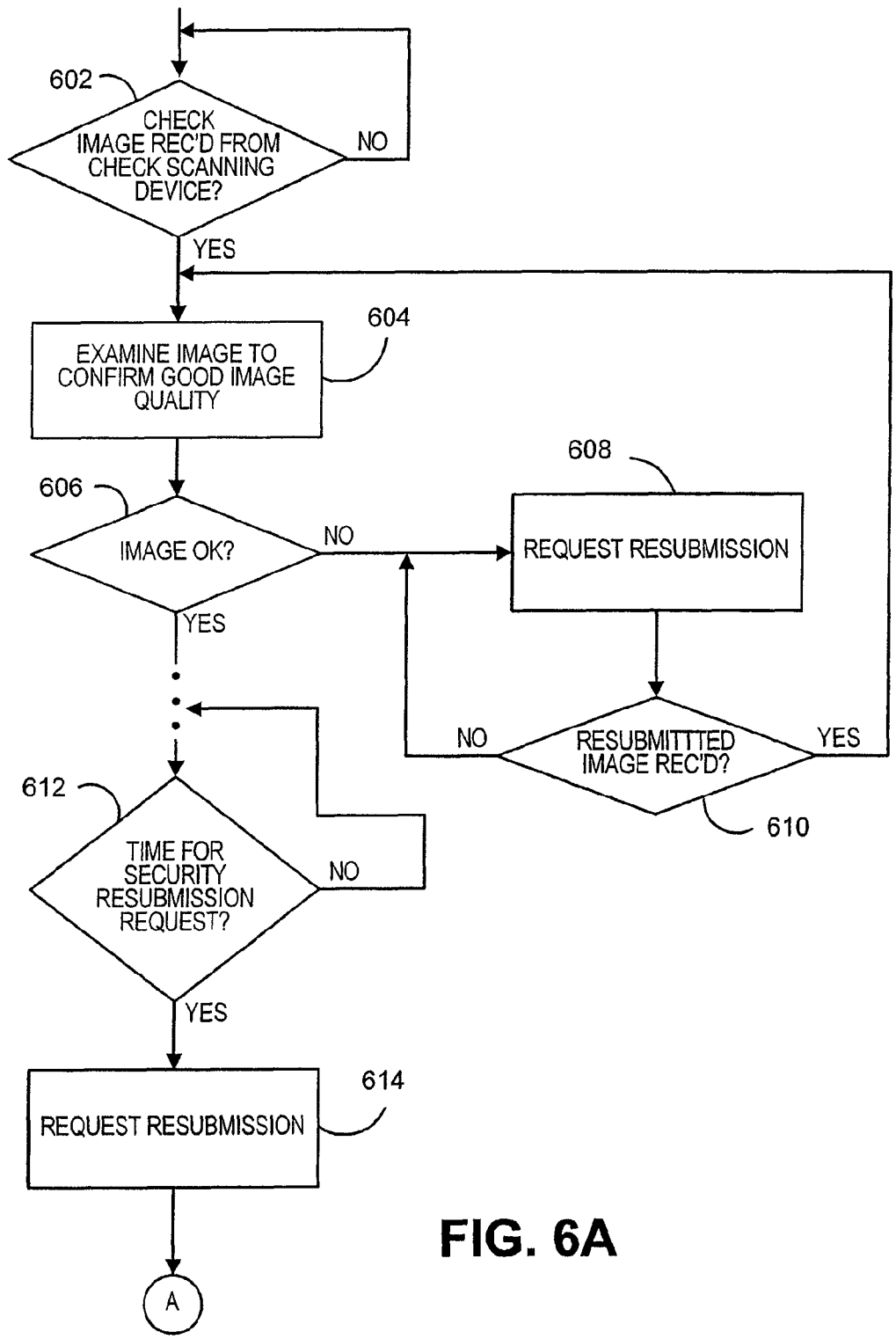
FIGS. 6A and 6B together form a flow chart that illustrates a process that may be performed by the computer of FIG. 5.
Figure 6B:
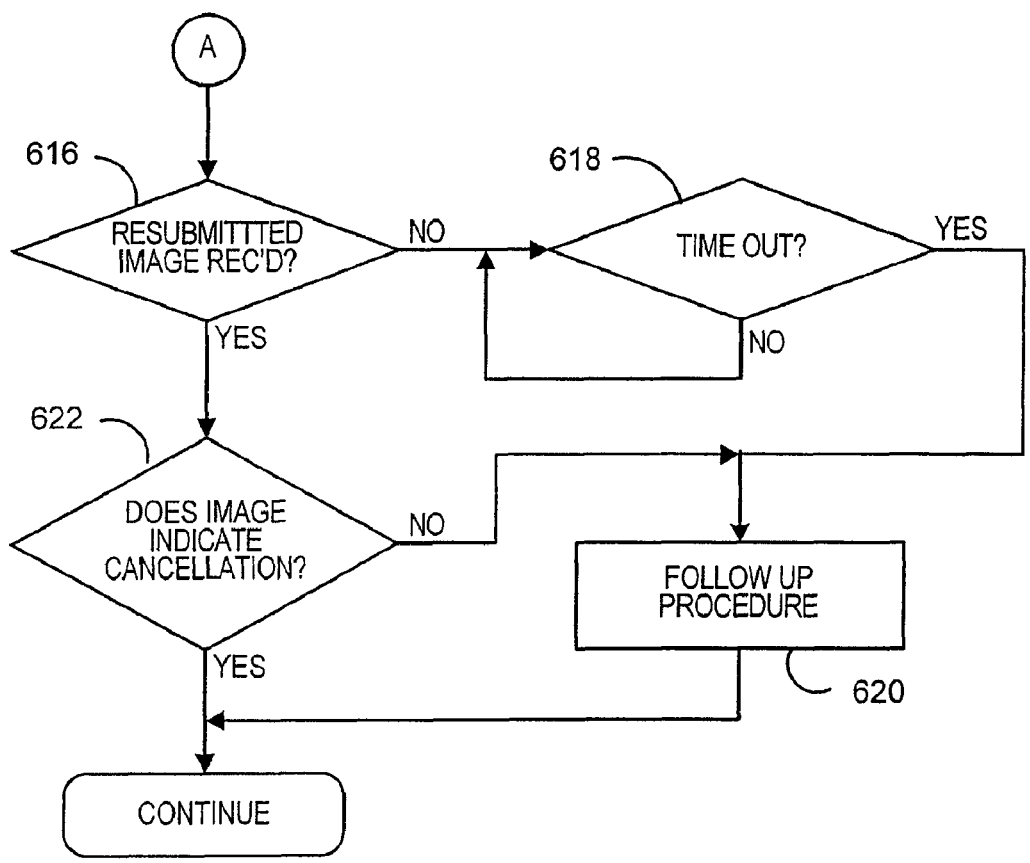

FIGS. 6A and 6B together form a flow chart that illustrates a process that may be performed by the computer 102.

At 602 in FIG. 6A, the computer 102 determines whether it has received a check image from a check scanning device. If so, then at 604 the computer 102 examines the check image to determine whether the quality of the image is acceptable, since errors in scanning or transmission may in some cases result in disruption in the image data. The process branches at 606 depending on whether the examination of the check image indicates that the check image is satisfactory. If the image is not satisfactory, then the computer 102 (as indicated at 608) sends a message to the check scanning device (or to the bank customer by another channel) requesting that the check be re-scanned so that the check image is resubmitted to the computer 102. At 610 it is determined whether the computer 102 has received the check image for which resubmission was requested. If so, the process loops back to 604. If not, the process loops back to 610. (In some embodiments, the number of retries for resubmission and/or for requesting resubmission may be counted and the loop may be exited if the number of retries exceeds a threshold. In such a case, human intervention may occur to attempt to resolve the issue of the continued failure to receive a satisfactory image for the check in question.)

Considering again the branching at 606, if it is found that the check image is satisfactory, then the process of FIGS. 6A and 6B may proceed to other tasks, such as, for example, receiving or waiting to receive other check images, generating substitute checks from the check images, and/or forwarding substitute checks for collection. Also, or alternatively, the computer 102 may take steps related to system security and/or integrity, as indicated by other blocks in FIGS. 6A and 6B. For example, as indicated at 612, the computer 102 may determine whether it is an appropriate occasion for requesting re-submission of a check image that has previously been received and found to be acceptable. The purpose of this request for re-submission is to determine whether proper cancellation had been applied to the check in question to assure that the payee of the check did not attempt to receive double payment for the check. For example, the computer 102 may be programmed to select checks for resubmission on a random basis and/or at regular intervals (e.g., once a week or once every two weeks and/or every one-hundredth or five-hundredth or one-thousandth check) with respect to each bank customer that submits check images for collection. In addition or alternatively, a request for resubmission of a particular check may be made by, or in response to, a human intervention. In some embodiments, the request for resubmission may normally be made shortly after the original submission of the check image so that the bank customer would be expected still to have the check on hand and near the check scanning device. This is consistent with requirements that the bank customer archive original checks for some time (perhaps several months) after submission. It therefore should not be a problem for the bank customer to resubmit the check on demand. One advantage of the present invention is that it is not readily apparent to the bank customer whether the resubmission request is made because of (A) problems with the original scan, (B) a routine audit (even if the customer is informed that audits may occur), or (C) suspicion of fraudulent activity.

If at 612 the computer determines that it is an appropriate occasion to select a previously-submitted check for resubmission, then it does so, as indicated at 614. At 614, the computer initiates a communication to the bank customer in question requesting that the selected check be resubmitted (i.e., re-scanned by the check scanning device). The communication with the bank customer may be via the check scanning device 104 and/or by another channel. The computer may indicate the selected check to the bank customer by batch and check number within the batch, for example. This information may previously have been generated by the check scanning device while processing the batch of checks in question and may have been communicated to the bank computer 102 as side information with the check images and/or may have been printed directly on the checks as the same were being processed by the check scanning device.

At 616 in FIG. 6B, it is determined whether the computer has received the re-submitted image of the requested check. If not, it is determined at 618 whether a time out period has expired. If so, the computer may launch a follow up procedure (block 620) and/or may prompt a human operator to initiate a follow up procedure to take appropriate steps to reflect the fact that the bank customer has failed to resubmit the requested check. In some cases, the follow up procedure may entail holding up collection of the check in question, and/or telephoning the bank customer and/or visiting the bank customer's premises to determine why the bank customer did not comply with the request to resubmit the check. In some cases, the result of the human investigation may cause a criminal investigation to be initiated.

If at 616 it is determined that the computer has received the resubmitted image, the computer 102 may then, as indicated at 622, examine the resubmitted image to determine whether it indicates cancellation of the check. (In some embodiments, a loop like that of blocks 604-610 may be present in the "yes" branch from 616 to assure that the quality of the resubmitted image is acceptable.) For example, the computer 102 may compare the resubmitted image with the image originally submitted with the check to determine whether the resubmitted image shows a cancellation mark or marks (including a cancellation character string or strings, etc.). If the resubmitted image does indicate that the check was cancelled, then no further action may be taken. However, if the resubmitted image does not indicate that the check was cancelled, the computer 102 may launch or prompt a human operator to initiate a suitable follow up procedure. In some embodiments, the computer 102 may merely send a message to the bank customer directing the bank customer to check the cancellation function of the check scanning device 104. Also, in such a case, the computer may select for resubmission the next check, or a check from the next batch of checks, submitted by the bank customer to determine whether the bank customer has had the cancellation function of the check scanning device repaired. In addition, or alternatively, the computer may request re-submission of other checks from the same batch and/or from other batches. In other cases, the follow up procedure may include a bank employee telephoning and/or visiting the bank customer to investigate why the requested check was not cancelled at the time the check was originally scanned. If appropriate, (e.g., if tampering with the check scanning device is found) the bank employee's investigation may lead to a referral for a criminal investigation.

It may be advisable for the check scanning device to be selectively operable in a "resubmission mode" in which the check scanning device informs the bank computer that the check currently being scanned has been previously submitted. The information may be provided to the bank computer from the check scanning device as side information, and may include a "resubmit code" provided by the bank computer when the resubmission was requested. The resubmit code may serve to identify the particular resubmission request made by the bank computer and may be used by the bank computer to match the resubmitted image with the resubmission request. During the resubmission mode, the cancellation function of the check scanning device may be disabled. Availability of a resubmission mode may be crucial for Check21 scanners to allow for remediation of such situations as poor scanning, a check jamming in the transport or exiting prematurely from the feed path, misalignment of the check during scanning, or double-feeding (two checks at once). By indicating a resubmission, the bank customer is able to indicate that he/she is not attempting a fraudulent duplicate submission but rather is trying to rectify a previous failure.

Figure 7:
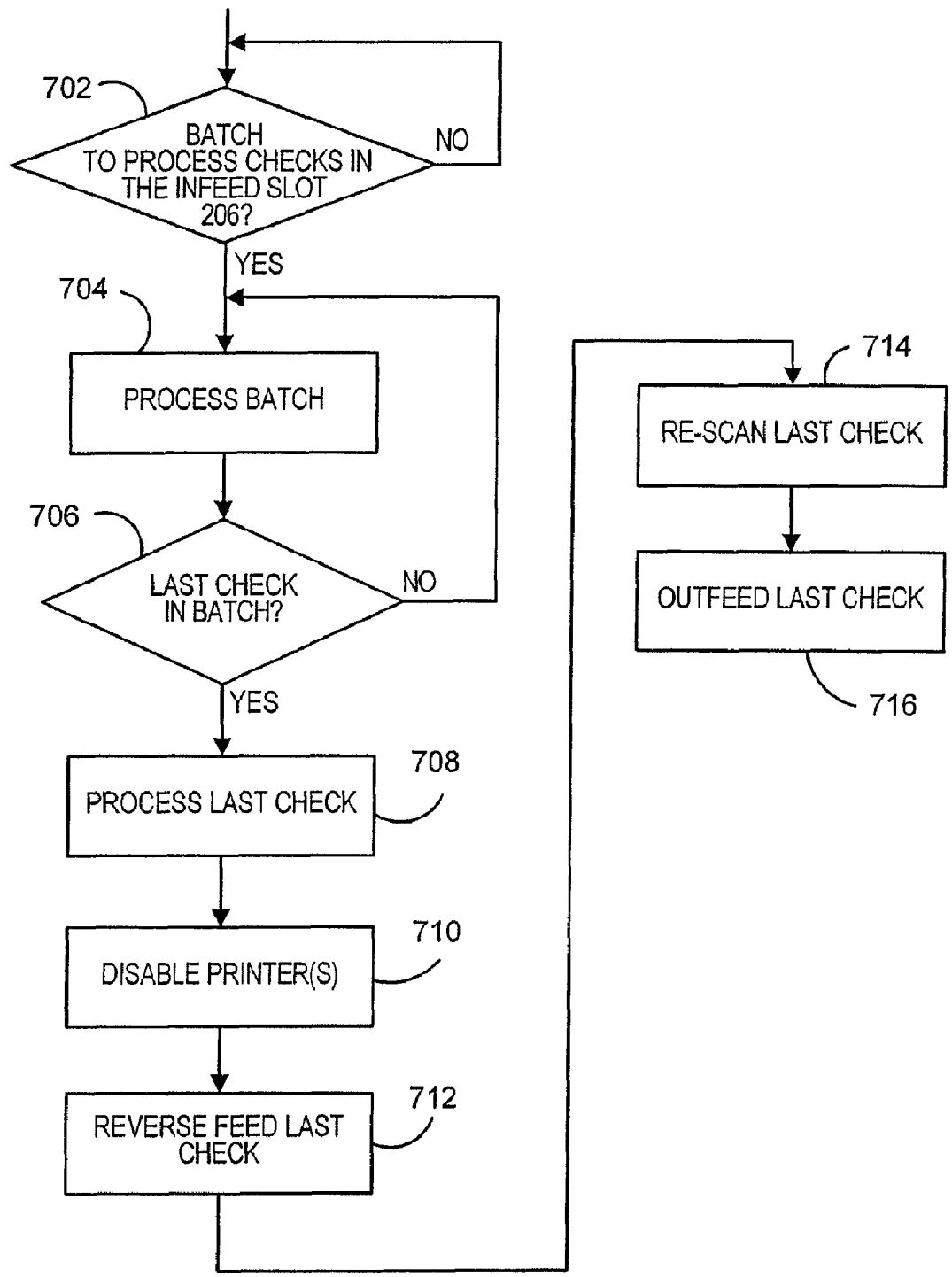
FIG. 7 is a flow chart that illustrates a process that may be performed by the check scanning device of FIG. 2 or FIG. 3.

FIG. 7 is a flow chart that illustrates a process that may be performed by the check scanning device 104 and/or 300. In the process of FIG. 7, the check scanning device, rather than the bank computer, selects a check for resubmission to the bank computer. For example, the check scanning device may select the last check of each batch for resubmission to check whether the cancellation function of the check scanning device is operating properly.

At 702 in FIG. 7, the check scanning device determines whether a batch of checks has been placed in the infeed slot 206 (FIGS. 2, 4) for processing by the check scanning device. For example, this determination may be made on the basis of a signal provided by the infeed slot sensor 416 (FIG. 4). If a batch of checks to be processed is detected, then as indicated at 704 in FIG. 7, the check scanning device proceeds to process the batch of checks. As will be understood from previous discussion, the processing of the batch of checks includes feeding the checks one-by-one through the feed path of the check scanning device, scanning each check to generate an image of the check, transmitting the check image to the bank computer, and printing a cancellation mark on the check or using other means (perforation, embossing, etc.) to indicate cancellation of the check.

At 706, the check scanning device determines whether the check currently being processed is the last check in the batch. This determination may be made on the basis of a signal from the infeed slot sensor 416 (e.g., indicating that no checks from the batch are left in the infeed slot). If the check currently being processed is the last check, then processing of the check proceeds to completion, as indicated at 708, and the check scanning device then enters a resubmission mode. In the resubmission mode, the print heads are disabled, as indicated at 710 and the transport components 402 (FIG. 4) of the check scanning device are controlled to operate in reverse so that the last check of the batch is fed in a reverse direction (as indicated at 712 in FIG. 7) along the feed path (e.g., from a point adjacent the outfeed slot back to a point adjacent the infeed slot).

At 714, the last check in the batch is scanned a second time (re-scanned) to generate an image for resubmission to the bank computer. In some embodiments, this may occur while the last check is being fed in a reverse direction past the line-scan camera(s) 406 and/or 408 (FIG. 4). In other embodiments, after the last check is reverse-fed, it is then fed once more in a forward direction for scanning by the line-scan camera(s) to generate the image for resubmission. In either case, after re-scanning the last check is outfed (716 in FIG. 7) to the outfeed slot.

When the check scanning device transmits to the bank computer the image generated by re-scanning the last check in the batch, the check scanning device may also submit, to the bank computer, side information that indicates that the accompanying image is a resubmission of the check submitted immediately before. The bank computer may respond to this side information by examining the resubmitted image to determine whether it indicates cancellation of the check in question. For example, the bank computer may compare the resubmitted image with the image originally submitted for the check to determine whether the resubmitted image shows cancellation mark(s). If the bank computer determines that the resubmitted image does not indicate cancellation of the check, the bank computer may send a message to the bank customer in question (e.g., via the check scanning device) alerting the bank customer to possible malfunction of the cancellation mechanism of the check scanning device. In this way the check scanning device and the bank computer may cooperate so that the check processing system 100 automatically detects malfunctioning of the cancellation mechanism of the check scanning device.

The above described features of the check processing system may aid in detection of security related malfunctions of the check scanning device and/or may aid in detecting, deterring and/or preventing wrongdoing by the bank customer who operates the check scanning device.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

A number of embodiments of the present invention have been described. Nevertheless, it will be understood that various modifications may be made without departing from the spirit and scope of the invention. Other variations relating to implementation of the functions described herein can also be implemented. Accordingly, other embodiments are within the scope of the following claims.

What is claimed is:

1. A method comprising:
   scanning a check on a first occasion to generate a first image of the check;
   cancelling the check;
   transmitting the first image to a financial institution;
   scanning the check on a second occasion later than the first occasion to generate a second image of the check;
   transmitting the second image of the check to the financial institution;
   determining if the check has been cancelled between the first occasion and the second occasion.

2. The method according to claim 1, wherein the first and second images are both generated by the same scanning device.

3. The method according to claim 1, wherein the second occasion immediately follows the first occasion.

4. The method according to claim 1, wherein the examining is performed at the financial institution.

5. The method according to claim 4, wherein the examining is performed automatically by a computer.

6. The method according to claim 5, wherein the examining includes comparing the second image to the first image.

* * * * *